United States Patent
Rupinski et al.

[11] Patent Number: 5,796,440
[45] Date of Patent: Aug. 18, 1998

[54] BASEBAND VIDEO/AUDIO/DATA TRANSCEIVER

[76] Inventors: Frederick A. Rupinski, 2 Carol Rd., Kinnelon, N.J. 07401; Stuart B. Rauch, 18 Glenmere Rd., New City, N.Y. 10956

[21] Appl. No.: 608,849

[22] Filed: Feb. 29, 1996

[51] Int. Cl.[6] ............................................. H04N 7/14
[52] U.S. Cl. ..................... 348/476; 348/12; 348/482; 348/723
[58] Field of Search ..................... 348/12, 6, 476, 348/478, 482, 15, 17, 724, 723, 725, 10

[56] References Cited

U.S. PATENT DOCUMENTS

| | | | |
|---|---|---|---|
| 4,821,101 | 4/1989 | Short | 348/482 |
| 4,847,699 | 7/1989 | Freeman | 348/482 |
| 5,392,223 | 2/1995 | Caci | 348/17 |
| 5,473,366 | 12/1995 | Imaeda et al. | 348/17 |
| 5,497,187 | 3/1996 | Banker et al. | 348/478 |
| 5,541,662 | 7/1996 | Adams et al. | 348/478 |
| 5,594,495 | 1/1997 | Palmer et al. | 348/17 |
| 5,606,554 | 2/1997 | Shibata et al. | 348/15 |

*Primary Examiner*—Victor R. Kostak

[57] ABSTRACT

The BASEBAND VIDEO/AUDIO/DATA TRANSCEIVER invention simultaneously transmits and receives baseband video signals, audio signals, and associated digital data and control signals within a single continuous signal over a single physical transmission line. The device is a single cohesive module, best embodied as an integrated circuit. The audio signals are sampled, and subsequently reconstructed. Audio samples and digital signals are multiplexed, then fed to a multirate elastic buffer. The multiplexed signals are extracted from the elastic buffer coincidentally with the video signal horizontal synchronization pulses and applied to these same pulses, then placed on a channel having a similar transceiver at the other end. The transceiver invention separates the received signals from the transmission line by canceling out its own transmitted signal. The received audio and digital data bursts are culled and reshaped. The video signal horizontal synchronization pulses are simultaneously restored to the received baseband video signal. The culled bursts are fed to a second multirate elastic buffer in synchronism with received video signal horizontal synchronization pulses. The culled multiplexed signals are extracted from the second elastic buffer at a constant reconstruction rate, demultiplexed, and then reconstructed. The transceiver timing and synchronization are controlled by two phase locked loops, one for transmitter timing and one for receiver timing, each with its own clock counting chain. The transmitter loop is locked to the transmitted video signal horizontal synchronization pulses, while the receiver loop is locked to the received video signal horizontal synchronization pulses.

13 Claims, 14 Drawing Sheets

VERTICAL SYNC REGION TIMING:

a. NTSC VERTICAL SYNC REGION
b. AUDIO SAMPLE CLOCK
c. FIFO SHIFT IN CLOCK
d. FIFO SHIFT OUT BURST GATE

SAMPLED DATA TIMING:

e. NTSC BASEBAND VIDEO SIGNAL
f. AUDIO SAMPLE CLOCK
g. FIFO SHIFT IN CLOCK
h. FIFO SERIAL BIT STREAM INPUT

TRANSMITTER BURST DATA TIMING:

i. TRANSMITTED NTSC VIDEO SIGNAL with SYNC BIT STREAM
j. BURST CLOCK ii. TRANSMITTED SYNC BIT STREAM DETAIL
jj. BURST CLOCK DETAIL

FIGURE 5A

BASEBAND VIDEO/AUDIO/DATA TRANSCEIVER

BACKGROUND-FIELD OF THE INVENTION

This invention addresses baseband audio/video signal transmission. More specifically, it provides a means to either transmit or receive both audio and baseband video signals on a single channel, such as a transmission line, without the presence of an additional audio carrier, such as the standard 5.7 megahertz broadcast carrier or the 10.7 megahertz intermediate frequency carrier. Also, the invention provides for the transmission of ancillary information, such as alphanumeric data, or command streams for remote control, via judicious allocation of the time and bandwidth available in the video signal profile.

BACKGROUND-DESCRIPTION OF PRIOR ART

Analog baseband video and analog audio signals are usually transmitted and received via separate channels. Common examples are the familiar standard television monitors, video tape recorders, and video cameras. It is well known that standard television broadcast and cable signals contain a separate frequency modulated radio frequency carrier just above the companion video band, where the total channel bandwidth is 6 megahertz.

Current activity regarding the state of television and video art is focused primarily on digital techniques. Digital video has made great strides in personal computer displays, and has made some practical advances in satellite broadcasting, however, increased bandwidth requirements (notwithstanding costly data compression techniques) and relatively high expense have yet to be overcome if broad public acceptance is to be achieved.

It is instructive to note that even in the computer networking environment, where digital video is king, video communications (for instance, video conferencing) is still of poor quality at best due to bandwidth limitations coupled with the inability of current data compression techniques to overcome these limitations. Furthermore, video traffic usually brings other network activity to a standstill because of the large information load that digital video places on most computer networks. Perhaps the greatest impediment to video transmission on computer networks is the cost factor. The price of every digital video product currently available for computer networks is so high that it is hopelessly out of line with what users expect to pay relative to what they are used to paying for other capabilities available to them.

Prior U.S. Pat. No. 5,235,115, Oct. 1, 1979, to Kergosien and Le Carvennec describes an audio transmission process which focuses on decorrelation of digitized samples by interleaving bits over several television line frame synchronization signals, and describes an apparatus to do this. Prior U.S. Pat. No. 4,333,108, May 10, 1980, to Quan and Ryan describes an apparatus for transmitting pulse width modulated samples in the video horizontal blanking intervals. Prior U.S. Pat. No. 4,665,431, May 5, 1987, to Cooper describes an apparatus and method for receiving signals transmitted as part of a television video signal. Similar use of television synchronization and blanking intervals precedes these patents, therefore these patents appear merely to claim specialized apparatus and processes which are applied to these intervals.

Taken in combination, U.S. Pat. Nos. 4,333,108, 4,665,431 and 5,235,115 describe a prior art which does not adequately address some basic issues germane to modern multimedia video technology, namely:

The structures are rigid with no means to reconfigure for a variety of applications; control, framing and timing cannot be programmed.

No interface means for microprocessors exist.

No interface means to transmission media exist.

No buffer elasticity exists for video signal timing variations, such as video tape recorder transport speed variations.

Serration intervals about vertical synchronization pulses are spanned using complex and inelastic means which are not transparent to to the sampled data stream.

The structures are not convieniently suited to modern error correction codes.

No feedback ocscillation prevention nor mute means is provided.

No filtering means exist for keeping data spectral energy within the video bandwidth.

OBJECTIVES AND ADVANTAGES

The BASEBAND VIDEO/AUDIO/DATA TRANSCEIVER is intended for deployment in video intercoms, closed circuit television, LAN video conference equipment, distribution of baseband video programmatic and educational material, security, telecommuting, or virtually any baseband television transmission application. To cite a typical example, the BASEBAND VIDEO/AUDIO/DATA TRANSCEIVER enables inexpensive, lightweight transmission lines to replace the heavy, expensive cabling used with tethered long lead television cameras commonly used at sporting events.

The BASEBAND VIDEO/AUDIO/DATA TRANSCEIVER offers the following advantages

Conservation of channel capacity; combined video, audio and data signal needs only one physical channel. This is especially significant in LAN environments, where current digital VIDEO TRANSMISSION methods tend to load a LAN channel so severly as to prevent other data from being transmitted at a reasonably fast rate. The BASEBAND VIDEO/AUDIO/DATA TRANSCEIVER allows transmission on existing spare channels (e.g., category 5 unshielded twisted pair wiring).

Conservation of bandwidth; all frequency components are less than 5 MegaHertz

Choice of digital or analog sync tip data.

Capable of low noise, high fidelety audio.

On board CODEC is provided.

Works with optional standard commercial audio CODEC.

Superior performance to current digital video transmission methods.

Order of magnitude less expensive than current digital video transmission methods.

Some additional related features are

The BASEBAND VIDEO/AUDIO/DATA TRANSCEIVER accepts either an analog signal directly, or a serial data streams from an audio CODEC.

The ability to pass data transparently allows error correction to be invoked within the internal CODEC, within an external CODEC, by means of software within a host microprocessor, or omitted if not needed.

The BASEBAND VIDEO/AUDIO/DATA TRANSCEIVER transmits audio as part of the standard video baseband waveform.

Internal detection and control circuitry prevents howling and whistling due to feedback oscillations.

The BASEBAND VIDEO/AUDIO/DATA TRANSCEIVER has an analog temporal compression/expansion means as an alternative to a FIFO.

The BASEBAND VIDEO/AUDIO/DATA TRANSCEIVER timing scheme provides for reliable operation in both directions even though the video transmission in one direction is completely asynchronous and independent from the other direction.

The BASEBAND VIDEO/AUDIO/DATA TRANSCEIVER is configurable via dynamic bus control, or via a static input code, to work with the NTSC, PAL or SECAM television baseband video signal standards.

The BASEBAND VIDEO/AUDIO/DATA TRANSCEIVER is configurable via dynamic bus control to select alphanumeric data or command streams for transmission and reception.

The BASEBAND VIDEO/AUDIO/DATA TRANSCEIVER is also configurable via an internal command stream interpreter, which is useful for video intercom or security applications.

Mute control is provided.

The BASEBAND VIDEO/AUDIO/DATA TRANSCEIVER is novel in that it is the only design existent which provides the utility, advantages, features and functions described above in a single, cohesive, comprehensively structured unit.

DRAWING FIGURES

The drawings show the invention in functional block diagram form. Selected blocks are expanded showing pertinent internal detail. Closely related drawings are identified with the same figure number, but with different alpabetical suffixes.

Waveform a. shows a NTSC vertical synchronization region.

Waveform b. shows the audio sampling clock.

Waveform c. shows the FIFO shift-in clock.

Waveform d. shows the FIFO shift-out burst gate.

Waveform e. shows a NTSC baseband signal (one horizontal scan).

Waveform f. shows the audio sample clock.

Waveform g. shows an expanded FIFO shift-in clock.

Waveform h. shows a typical FIFO serial bit stream.

Waveform i. shows the transmitted video signal with the serial bit stream embedded into the horizontal synchronization pulses.

Waveform j. shows the serial bit stream burst clock.

Waveform ii. shows a detailed view of the transmitted serial bit stream embedded into the horizontal synchronization pulses.

Waveform jj. shows a detailed view of the serial bit stream burst clock.

Figure 1A:
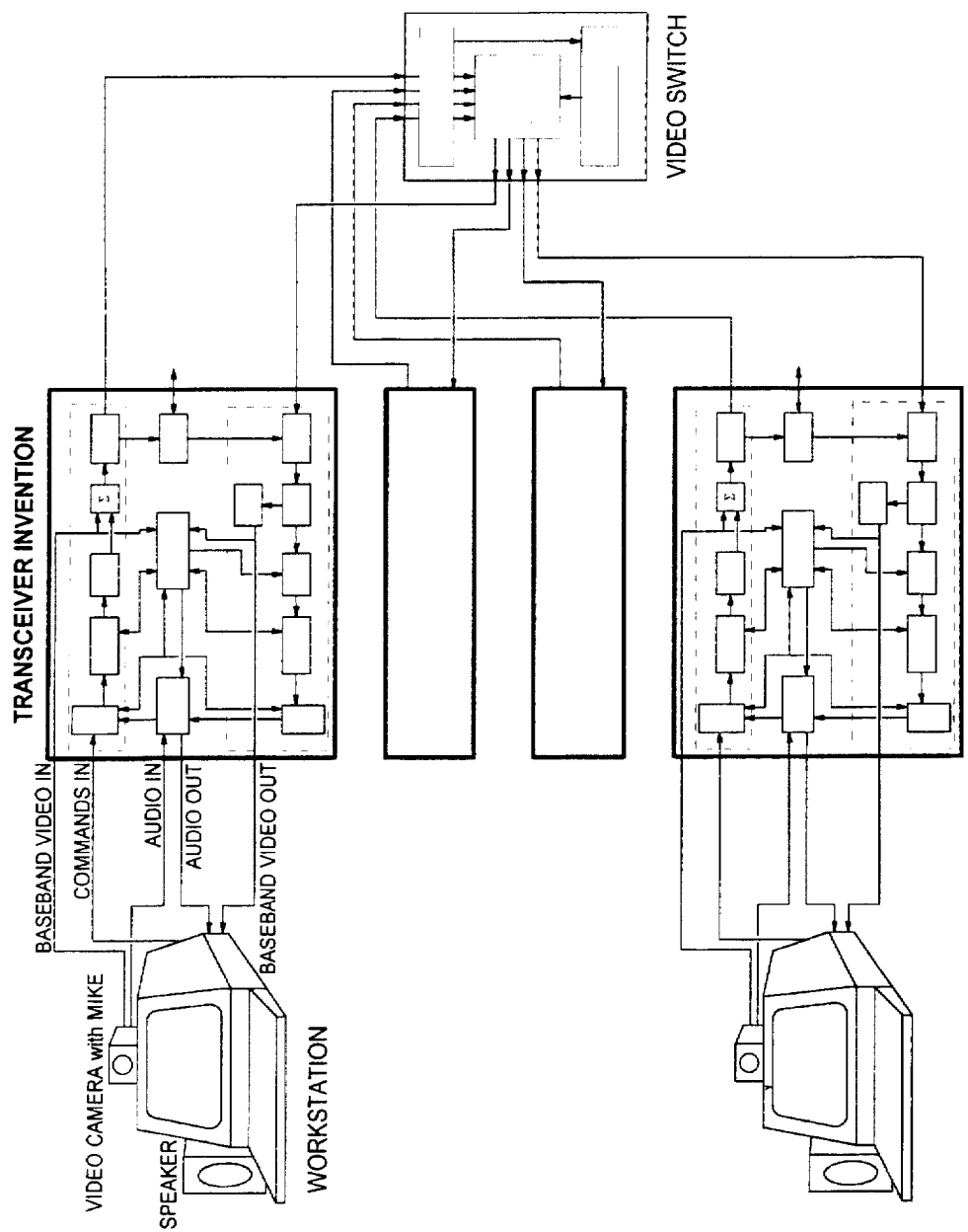
FIG. 1A shows an example of the invention in a practical application.
Figure 1B:
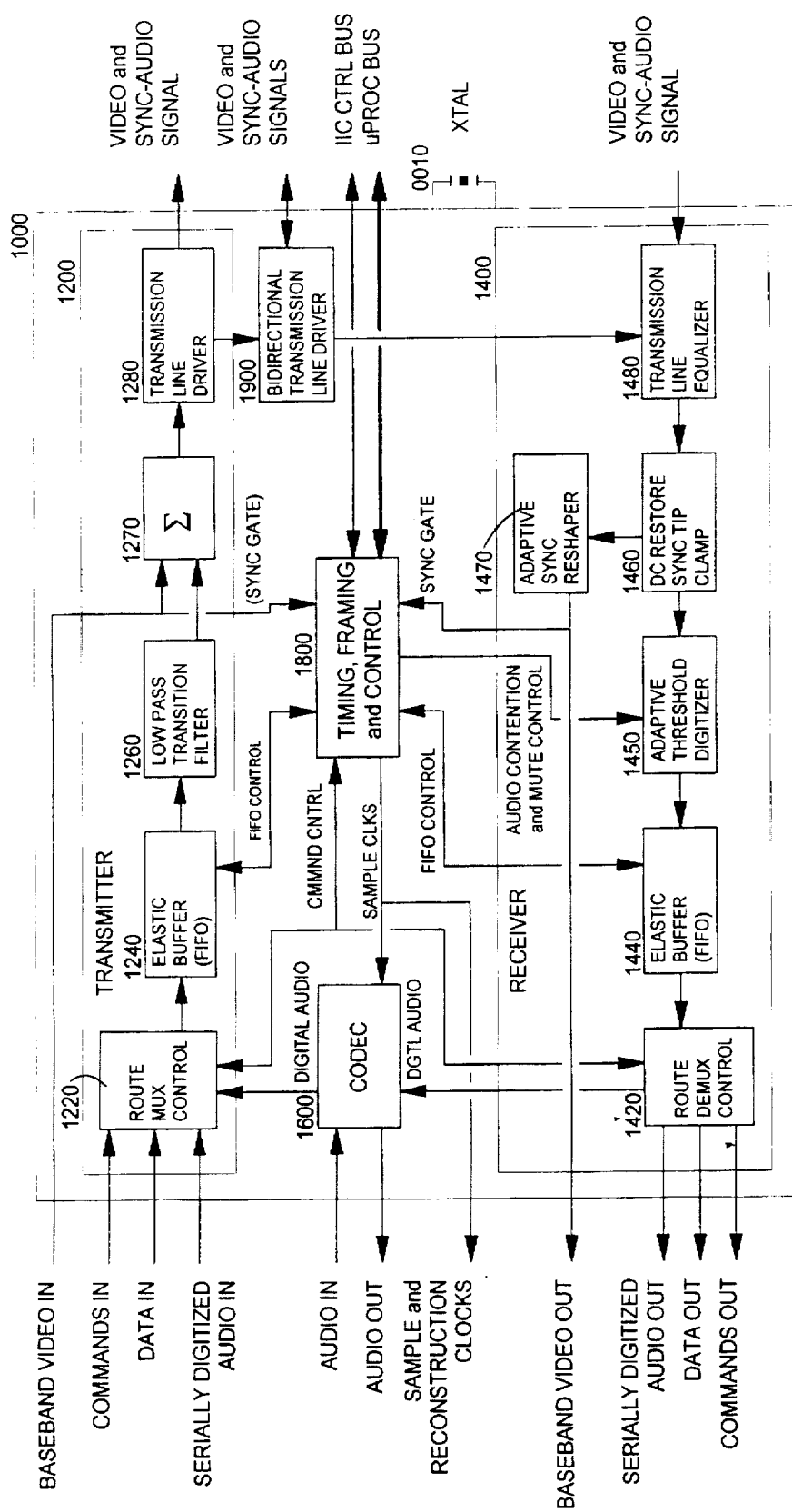
FIG. 1B shows the invention.
Figure 2:
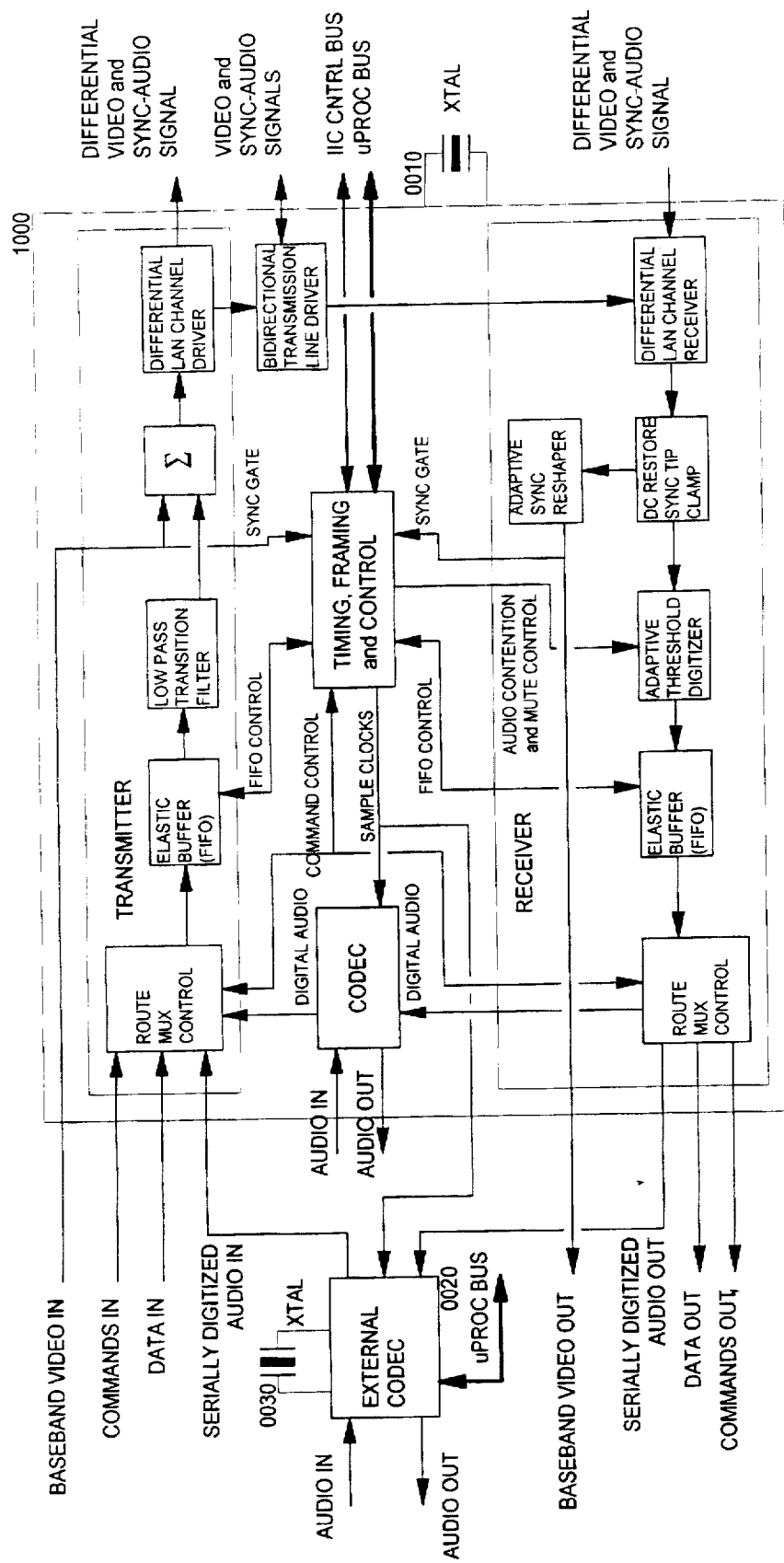
FIG. 2 shows the structure of the invention as configured to operate with a commercial multimedia audio CODEC.
Figure 3:
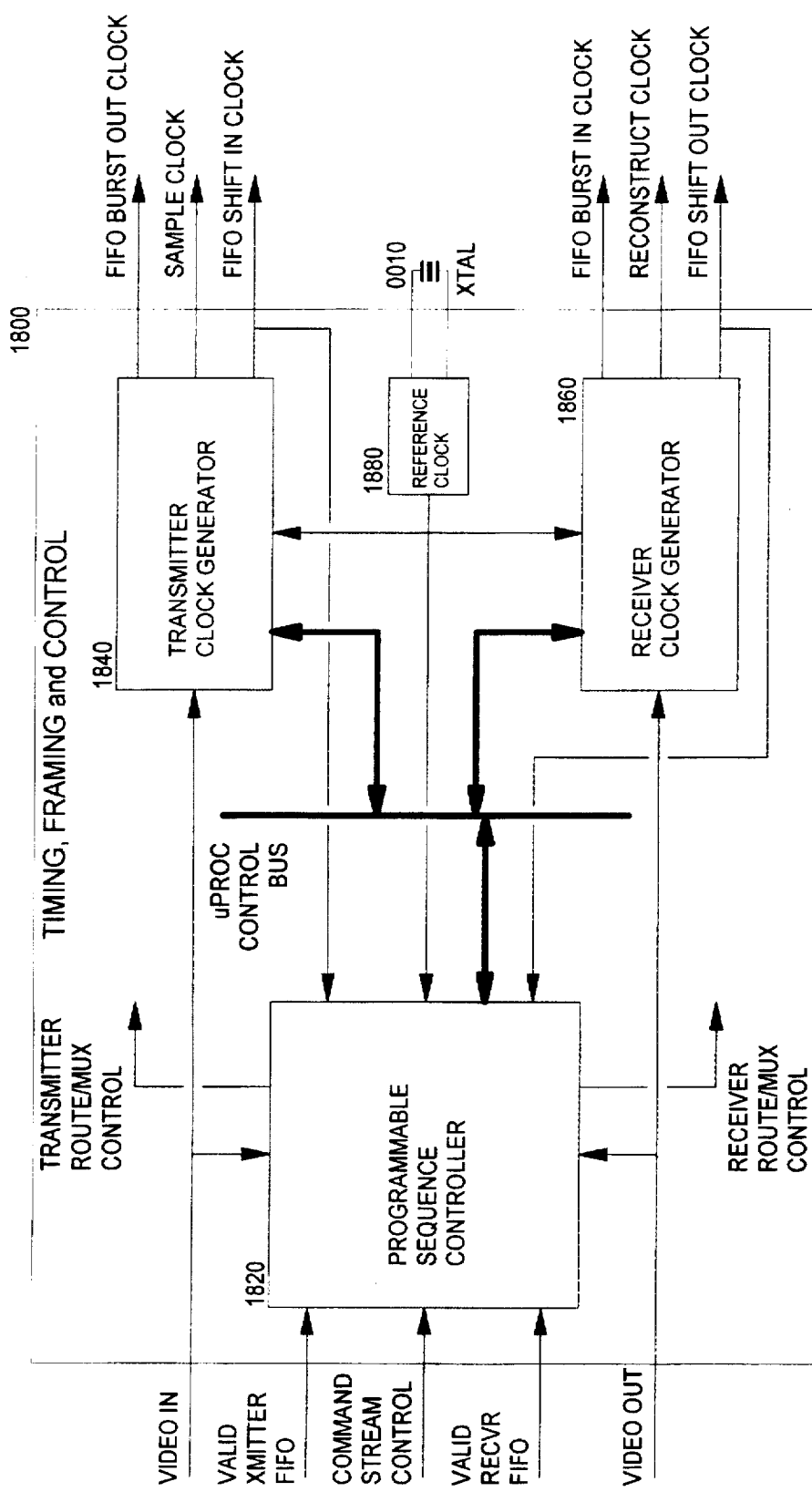
FIG. 3 shows the salient structural elements of the timing, framing and control block.
Figure 4:
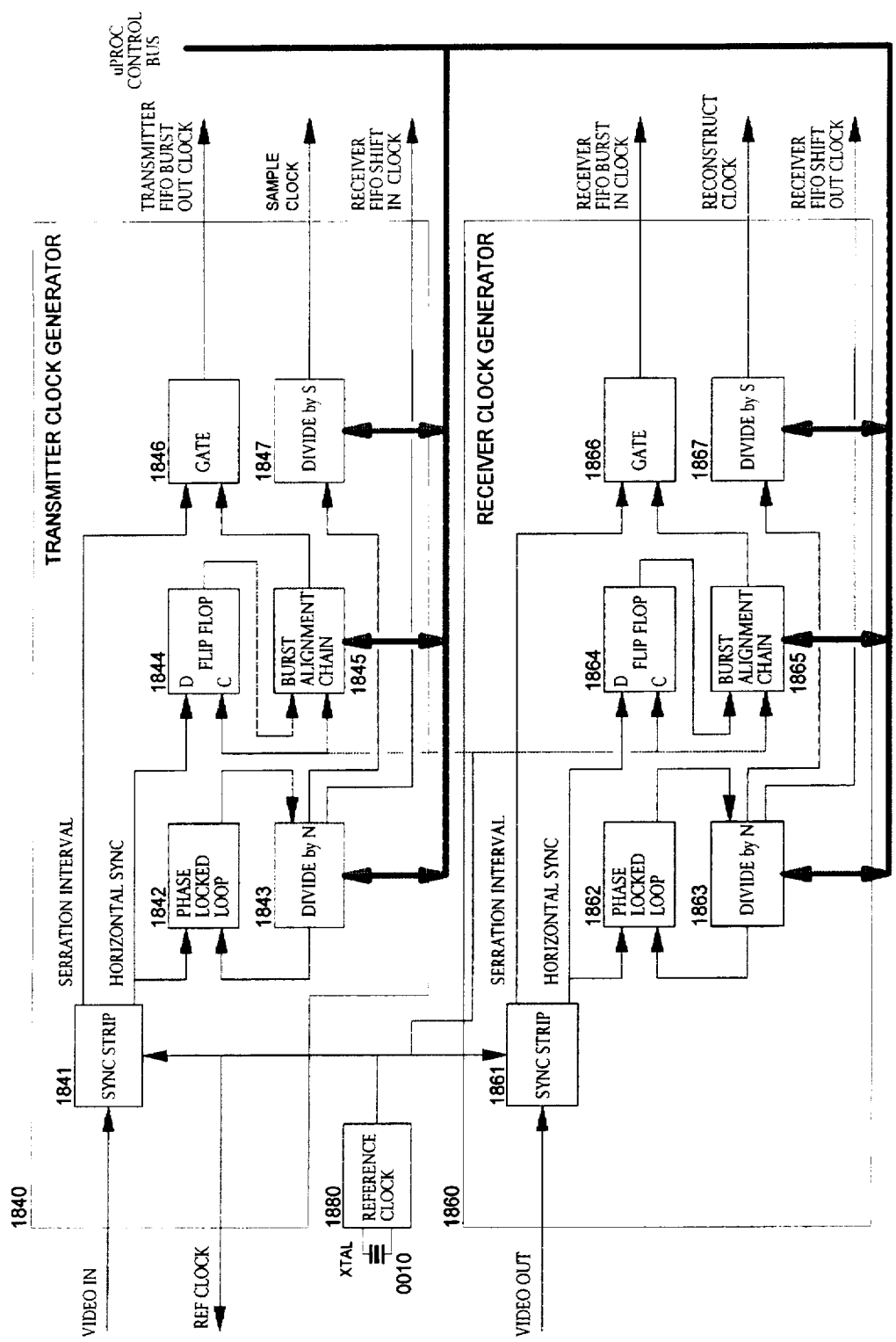
FIG. 4 shows how incommensurate timing relationships between the transmitted and received video signals are reconciled.
Figure 5B:
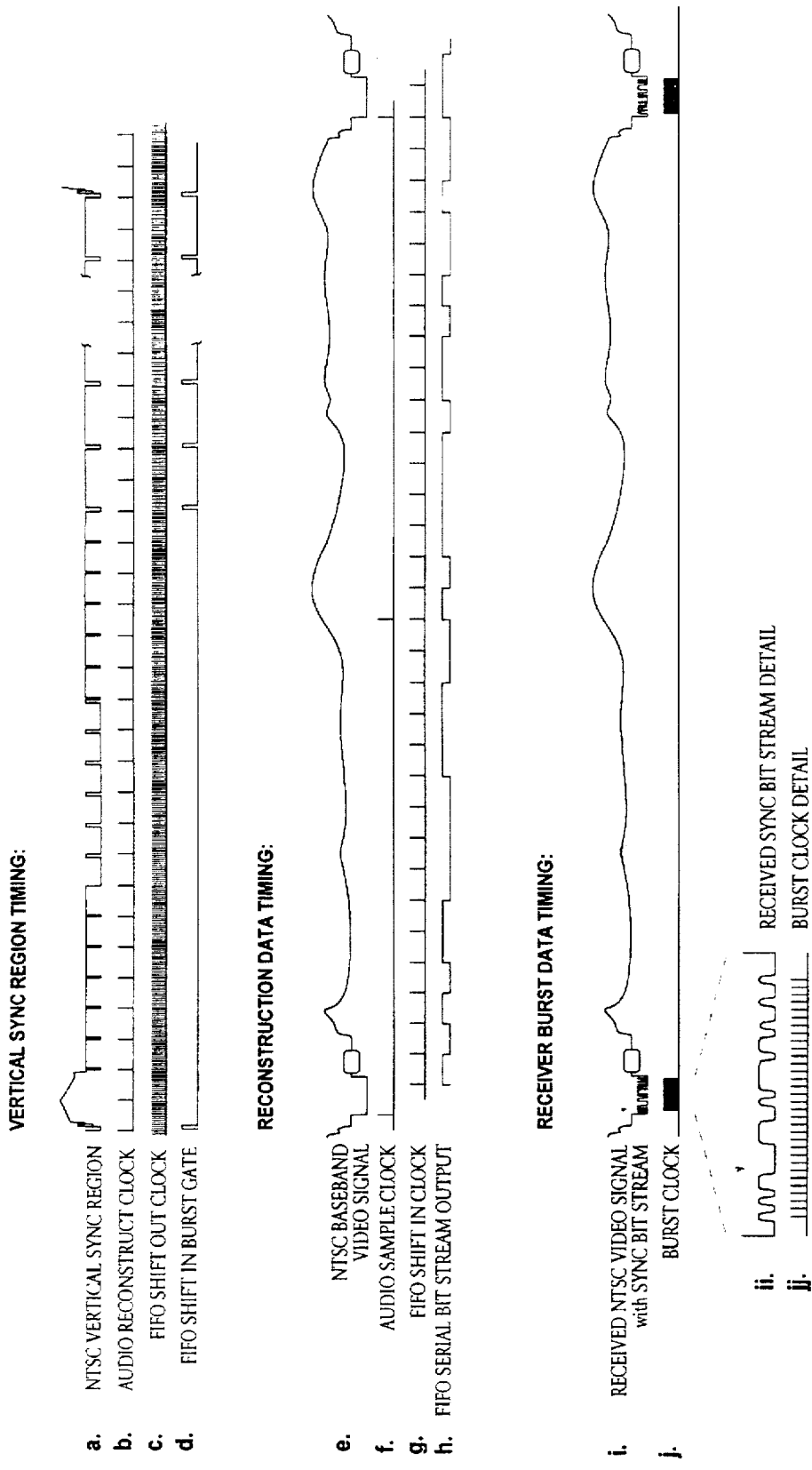
FIG. 5A shows the transmitter timing relationships of the basic timing signals in the structure of FIG. 3.

FIG. 5B shows the receiver timing relationships of the basic timing signals in the structure of FIG. 3.

Waveform a. shows a NTSC vertical synchronization region.

Waveform b. shows the reconstruction clock.

Waveform c. shows the FIFO shift-out clock.

Waveform d. shows the FIFO shift-in burst gate.

Waveform e. shows a NTSC baseband signal (one horizontal scan).

Waveform f. shows the audio sample clock.

Waveform g. shows an expanded FIFO shift-in clock.

Waveform h. shows a typical FIFO serial bit stream output.

Waveform i. shows the received NTSC video signal with the serial bit stream embedded into the horizontal synchronization pulses.

Waveform j. shows the serial bit stream burst clock.

Waveform ii. shows a detailed view of the received serial bit stream embedded into the horizontal synchronization pulses.

Waveform jj. shows a detailed view of the serial bit stream burst clock.

Figure 6:
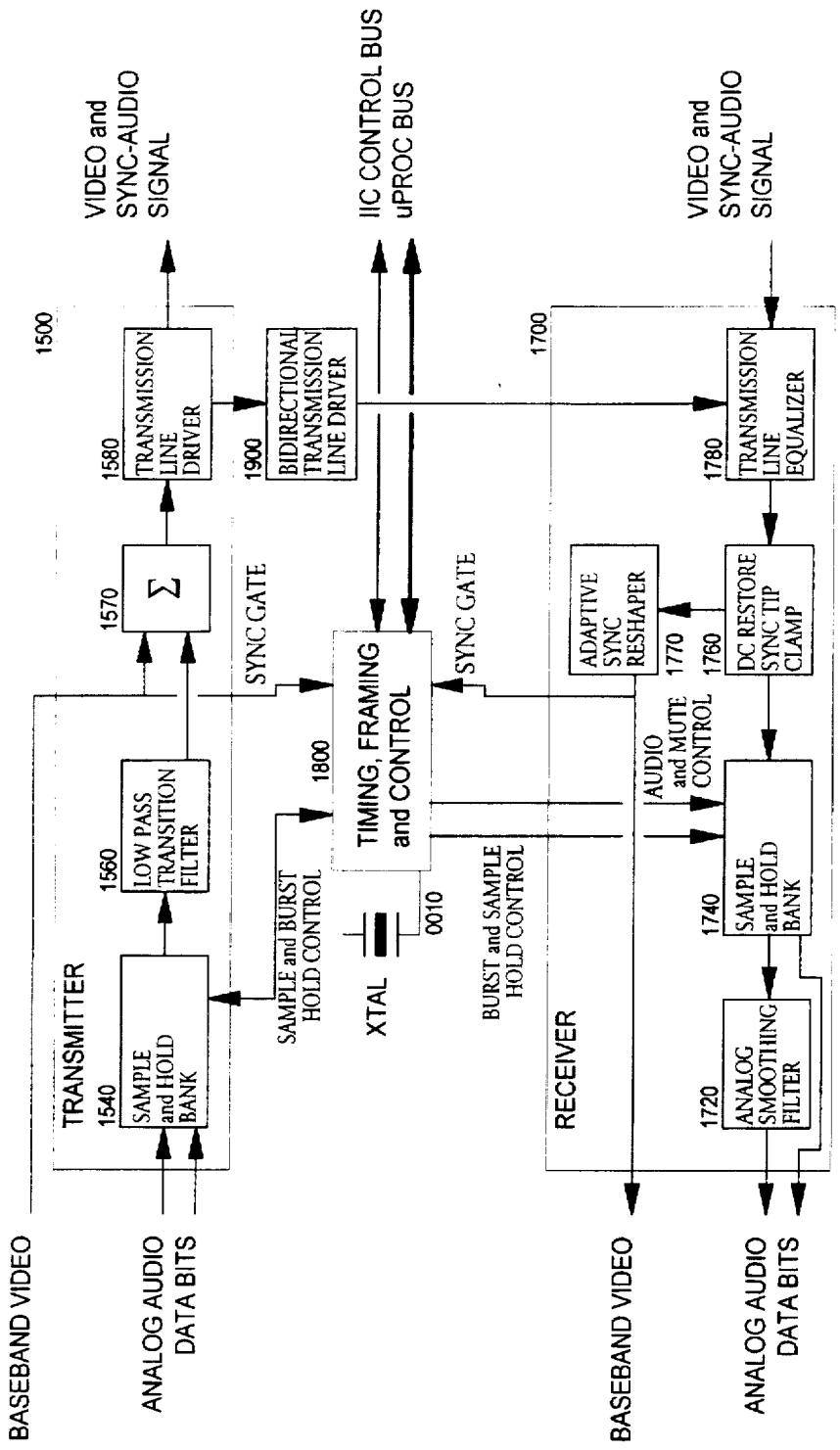

FIG. 6 shows the structure of the invention as configured to operate directly with analog input and output signals, thereby obviating the need for an audio CODEC, or the need for analog to digital conversion and digital to analog reconversion.

Figure 7B:
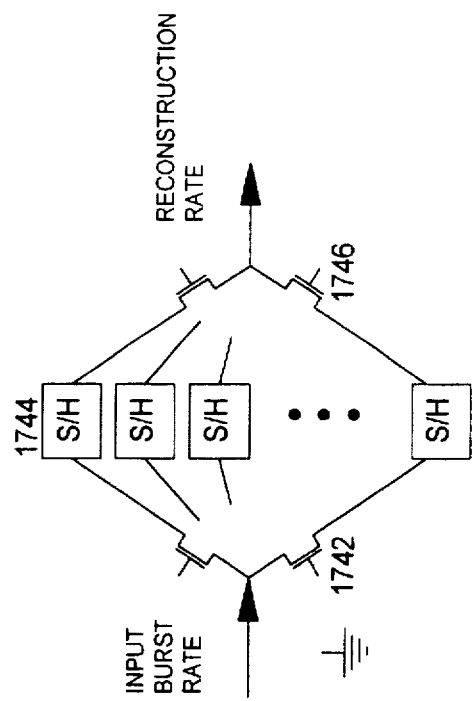
Figure 7A:
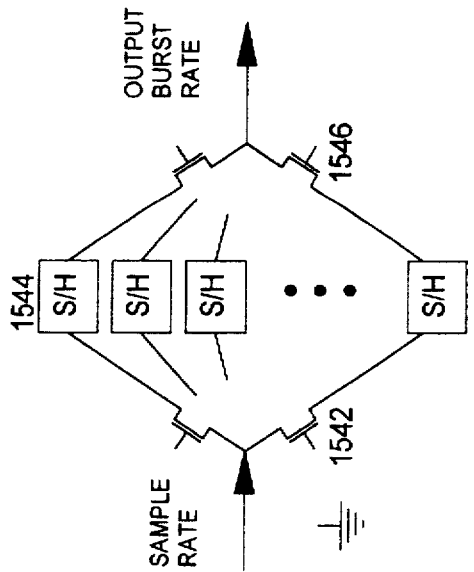

FIG. 7A shows the detail of the analog sample and hold bank used to temporally compress the analog signal input to the structure of FIG. 6.

FIG. 7B shows the detail of the analog track and hold bank used to temporally expand the analog signal to be output from to the structure of FIG. 6.

Figure 8A:
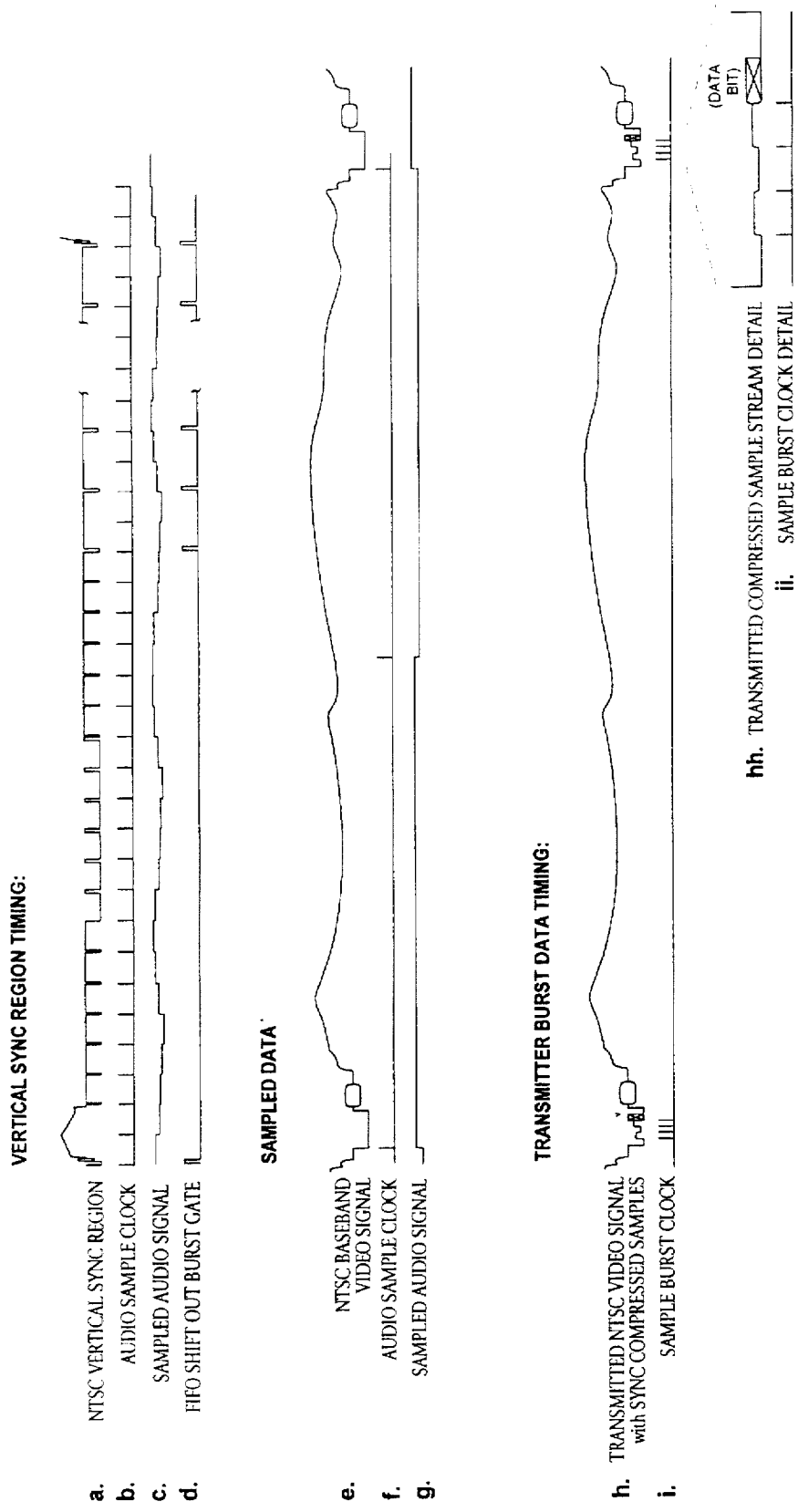

FIG. 8A shows the relationship of the serialized digital audio data samples with the basic timing signals of FIG. 6, and also with the baseband video signals.

Waveform a. shows a NTSC vertical synchronization region.

Waveform b. shows the audio sampling clock.

Waveform c. shows the sampled (and held) audio signal.

Waveform d. shows the FIFO shift-out burst gate.

Waveform e. shows a NTSC baseband signal (one horizontal scan).

Waveform f. shows the audio sample clock.

Waveform g. shows the sampled audio signal.

Waveform h. shows the transmitted video signal with audio sample levels compressed into the horizontal synchronization pulses.

Waveform i. shows the sample burst clock.

Waveform hh. shows a detailed view of the transmitted compressed sampled data stream embedded into the horizontal synchronization pulses.

Waveform ii. shows a detailed view of the sample burst clock.

Figure 8B:
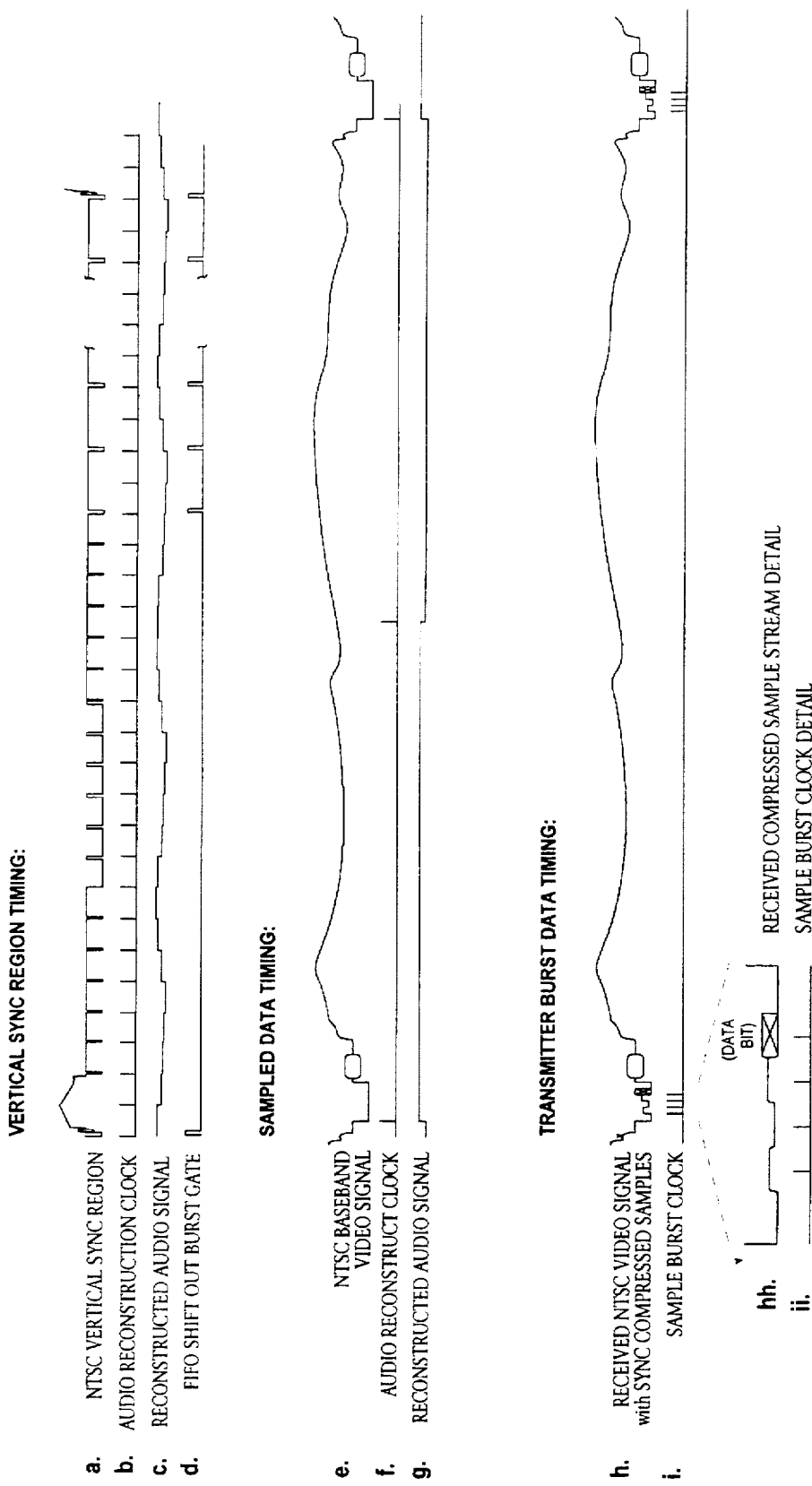

FIG. 8B[, titled "Receiver Analog Sample and Burst Clocks for Baseband Video/Audio Transceiver Module".] shows the relationship of the analog audio signals and the sample and hold signals with the basic timing signals of FIG. 6, and also with the baseband video signals.

Waveform a. shows a NTSC vertical synchronization region.

Waveform b. shows the audio reconstruction clock.

Waveform c. shows the reconstructed audio signal.

Waveform d. shows the FIFO shift-out burst gate.

Waveform e. shows a NTSC baseband signal (one horizontal scan).

Waveform f. shows the audio reconstruction clock.

Waveform g. shows reconstructed audio signal.

Waveform h. shows the received video signal with audio sample levels compressed into the horizontal synchronization pulses.

Waveform i. shows the sample burst clock.

Waveform hh. shows a detailed view of the received compressed sampled data stream embedded into the horizontal synchronization pulses.

Waveform ii. shows a detailed view of the sample burst clock.

Figure 9:
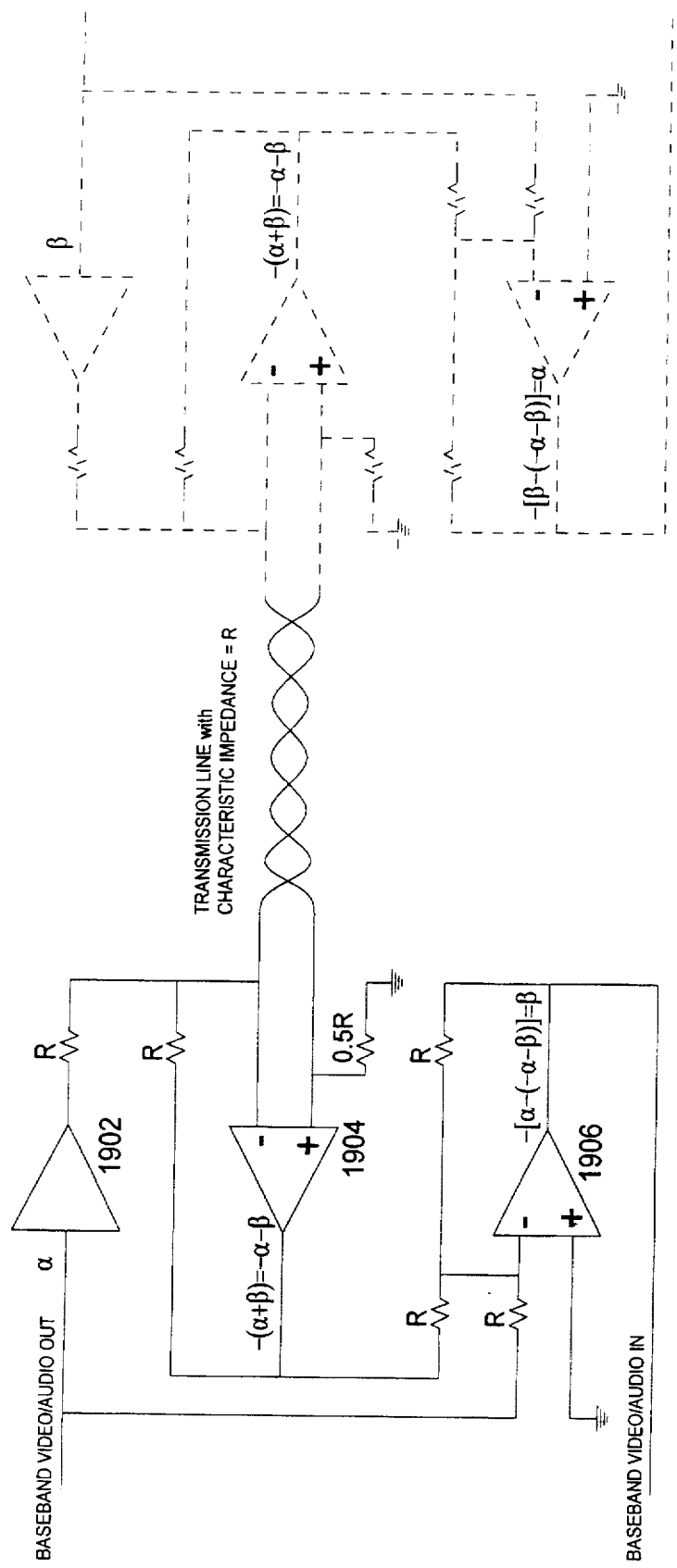

FIG. 9 shows the circuit functions which cancel the signal sent from each end so that only the signal transmitted from the other end is present.

Figure 10:
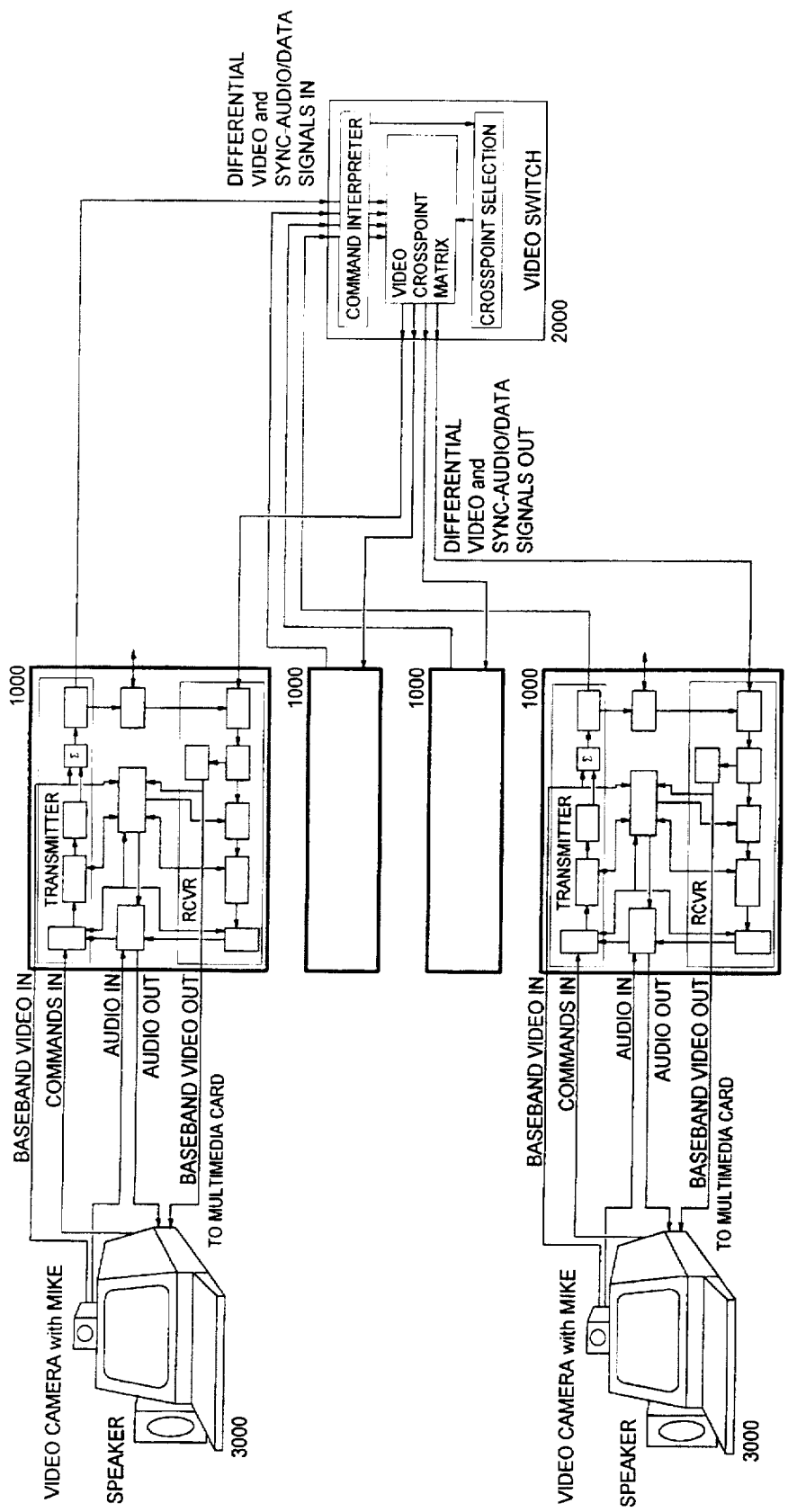

FIG. 10 provides an overview of the invention and its relationship with a generic video communications application.

Figure 11:
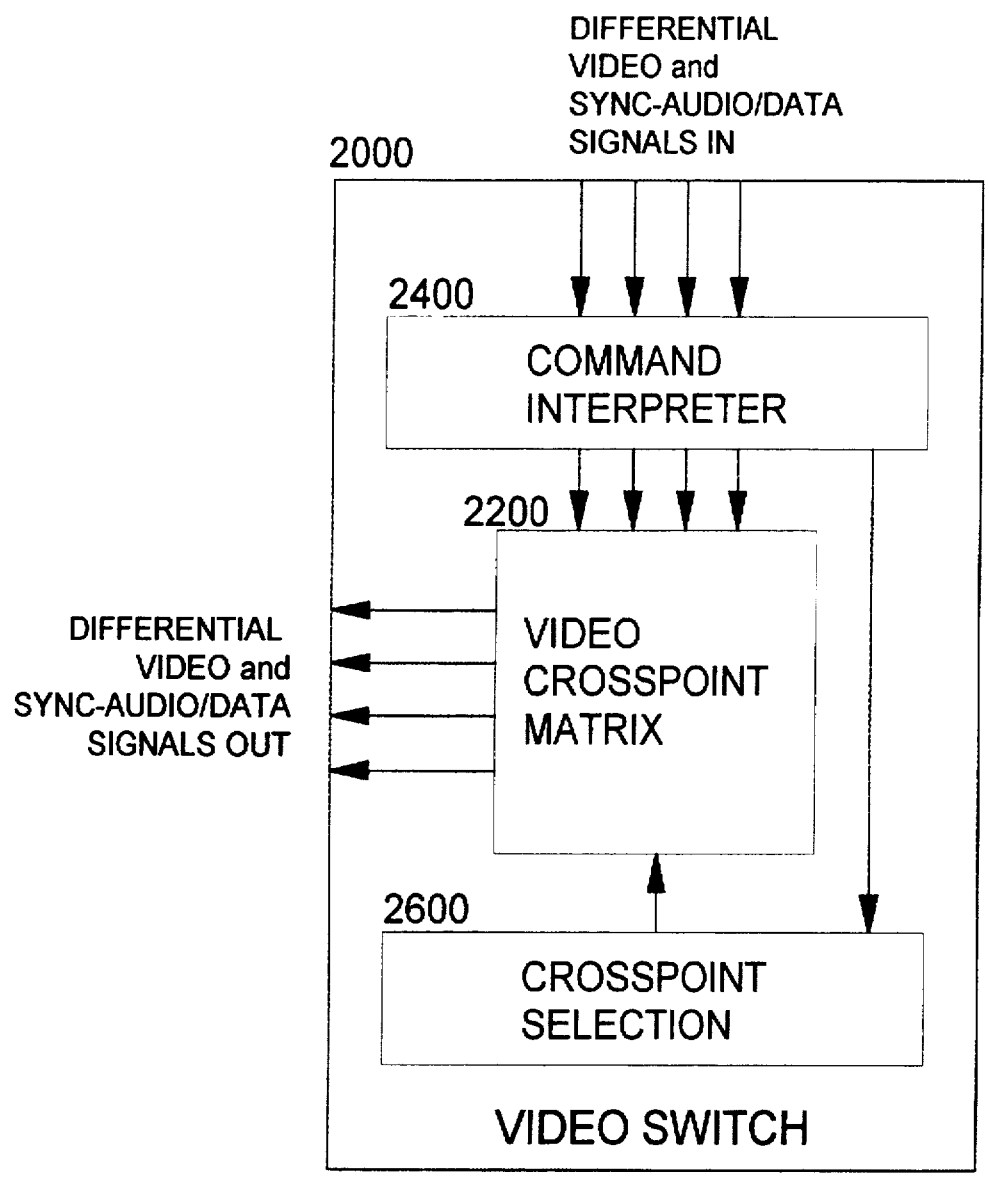

FIG. 11 shows a hypothetical generic video network switch.

REFERENCE NUMERALS IN DRAWINGS

The reference numerals are assigned to the drawing elements in a somewhat heirarchical order: the major elements are numbered as thousands; sub elements as hundreds and so on. Numerals less than a hundred are used for incidental elements.

The assignments are as follows:

0010 is the baseband video/audio transmitter clock crystal

0020 is the external CODEC.

0030 is the external CODEC clock crystal

1000 is the BASEBAND VIDEO/AUDIO/DATA TRANSCEIVER module invention.

1200 is the serial bit stream baseband video/audio transmitter.

1220 is the router/multiplexer for the video, data and control transmitted signals.

1240 is the elastic buffer for staging serial bit bursts from input samples.

1260 is the video bandwidth low pass filter.

1270 is the video/bit burst combiner.

1280 is the transmitter transmission line driver.

1400 is the serial bit stream baseband video/audio receiver.

1420 is the router/demultiplexer for the video, data and control received signals.

1440 is the elastic buffer for restaging serial samples from culled bit bursts.

1450 is the threshold circuit for culling bit bursts from the video horizontal sync tip.

1460 is the video horizontal sync tip DC restorer.

1470 is the video horizontal sync tip regenerator.

1480 is the transmission signal equalizer.

1500 is the analog baseband video/audio transmitter.

1540 is the sample and hold elastic buffer for staging time compressed analog samples from analog input samples.

1542 is the sample switch bank.

1544 is the sample and hold bank.

1546 is the output burst switch bank.

1560 is the video bandwidth low pass filter.

1570 is the video/analog input sample burst combiner.

1580 is the transmitter transmission line driver.

1600 is the audio CODEC.

1700 is the analog baseband video/audio receiver.

1720 is the reconstructed analog signal smoothing filter

1740 is the sample and hold elastic buffer for restaging analog input samples culled from time compressed analog samples.

1742 is the input burst switch bank.

1744 is the sample and hold bank.

1746 is the reconstruction switch bank.

1760 is the video horizontal sync tip DC restorer.

1770 is the video horizontal sync tip regenerator.

1780 is the transmission signal equalizer.

1800 is the timing and control circuit.

1820 is the sequence controller.

1840 is the transmitter clock generator circuit.

1841 is the video input sync stripper circuit.

1842 is the video input horizontal sync phase locked loop.

1843 is the video input horizontal sync phase locked loop frequency divider counter.

1844 is the video input horizontal sync alignment flip flop.

1845 is the output burst clock alignment chain.

1846 is the output burst enable gate.

1847 is the audio output sample clock divider chain.

1860 is the receiver clock generator circuit.

1861 is the video output sync stripper circuit.

1862 is the video output horizontal sync phase locked loop.

1863 is the video output horizontal sync phase locked loop frequency divider counter.

1864 is the video output horizontal sync alignment flip flop.

1865 is the input burst clock alignment chain.

1866 is the input burst enable gate.

1867 is the audio input reconstruction clock divider chain.

1880 is the reference clock generator circuit.

1900 is the bidirectional transmission line driver/receiver.

1902 is a buffer amplifier.

1904 is a summing amplifier.

1906 ia a negation amplifier.

2000 is a hypothetical generic video network switch.

2200 is a video crosspoint matrix switch.

2400 is a switching command stream interpreter circuit.

2600 is the crosspoint matrix on/off selector.

3000 is a hypothetical generic video conference workstation.

DESCRIPTION-FIGS. 1, 2, 3, 4, 6, 7A, 7B and 9

The baseband video/audio transceiver module(1000) invention is a device for simultaneously transmitting and receiving baseband video signals, audio signals, and associated digital data and control signals over a single physical transmission line. The device is structured as a single cohesive module, with the preferred embodiment being an ASIC, which is an application specific integrated circuit.

The baseband video/audio transceiver module accepts an analog audio signal at the input of the audio CODEC(1600). The audio CODEC samples the audio signal and then converts the samples into a serial bit stream, which it then sends to the router/multiplexer(1220) element of the serial bit stream baseband video/audio transmitter(1200). The router/ multiplexer also accepts data and control signal bit streams, which it formats under the control of the timing and control circuit(1800).

The baseband video/audio transceiver module has an input to the router/multiplexer for an external CODEC (0020) which provides an interface means for computer based multimedia applications, and which may also provide error correction, data compression, volume and tone control, mute control, and audio feedback howl suppression.

The timing reference for the baseband video/audio transceiver module is the reference clock crystal(0010).

The serial bit stream baseband video/audio transmitter (1200) consists of the router/multiplexer(1220) mentioned above, a FIFO(1240) which is a multirate first in first out elastic buffer for the formatted serial bit stream, a low pass filter(1260) for limiting the bandwidth of the formatted serial bit stream to fall within the baseband video bandwidth, a summing circuit(1270) which is the video/bit burst combiner, and the transmitter transmission line driver (1280).

The serial bit stream baseband video/audio receiver(1400) consists of the router/demultiplexer(1420) which serves as the inverse function of the router/multiplexer(1220) mentioned above, a FIFO(1440) which is a multirate first in first out elastic buffer for the culled bit bursts, a video horizontal sync tip voltage level restorer(1460), a video horizontal sync tip regenerator(1470) which removes the video horizontal sync tip bit stream burst, a threshold circuit(1540) which culls the bit bursts from the video horizontal sync tip, and the input transmission line equalizer(1480).

The timing, framing and control circuit(1800) consists of the sequence controller(1820) which controls the formatting and routing of the transmitted signals and also the reformatting and rerouting of the received signals, the transmitter clock generator circuit(1840) which generates the audio sampling clock, the FIFO shift in clock and the FIFO burst out clock in synchronism with the transmitted baseband video/audio signal, the receiver clock generator circuit (1860) which generates the audio reconstruction clock, the FIFO burst in clock and the FIFO shift out clock in synchronism with the received baseband video/audio signal, and the reference clock generator circuit(1880) which provides an unambiguous time reference signal for reconciling the incommensurate occurances of the transmitted and received baseband video/audio/data signals.

The transmitter clock generator circuit(1840) consists of the video output sync stripper circuit(1841), the video output horizontal sync phase locked loop(1842) for alignment of the audio sampling clock, the FIFO shift in clock and the FIFO burst out clock with the transmitted baseband video/audio signal, the video output horizontal sync phase locked loop frequency divider counter(1843) which provides the base frequency for the audio sampling clock and shift frequency for the FIFO shift in clock, the video output horizontal sync alignment flip flop(1844) which aligns the transmitted baseband video horizontal synchronization pulse with the reference clock(1880), the output burst clock alignment chain(1845) which provides the proper frequency and position for the burst out clock, the audio output sample clock divider chain(1847) which is derived from the base frequency at the phase locked loop frequency divider counter, and the output burst enable gate(1846) which allows bursts only during horizontal synchronization pulses and not during the vertical serration interval.

The receiver clock generator circuit(1860) consists the video input sync stripper circuit(1861), the video input horizontal sync phase locked loop(1862) for alignment of the audio reconstruction clock, the FIFO shift out clock and the FIFO burst in clock with the received baseband video/ audio signal, the video input horizontal sync phase locked loop frequency divider counter(1863) which provides the base frequency for the audio reconstruction clock and shift frequency for the FIFO shift out clock, the video output horizontal sync alignment flip flop(1864) which aligns the received baseband video horizontal synchronization pulse with the reference clock(1880), the input burst clock alignment chain(1865) which provides the proper frequency and position for the burst in clock, the audio input sample clock divider chain(1867) which is derived from the base frequency at the phase locked loop frequency divider counter, and the input burst enable gate(1866) which allows bursts only during horizontal synchronization pulses and not during the vertical serration interval.

The bidirectional transmission line driver/receiver(1900) consists of a buffer amplifier(1902), a summing amplifier (1904) which overlays the transmitted signal onto the transmission line received signal, and a negation amplifier(1906) which locally cancels out the transmitted signal leaving only the received signal.

The analog embodiment of the baseband video/audio transceiver module(1000) invention is simpler than the CODEC embodiment thus more suited to cost sensitive applications which do not need the better performance, namely regarding total harmonic distortion and dynamic range, obtainable using a CODEC.

In place of the CODEC, the analog baseband video/audio transmitter(1500) has a sample and hold bank(1540) which holds sampled voltages acquired at the sample rate and then forwards them to the the video/bit burst combiner(1570) at the burst rate. Similarly, the analog baseband video/audio receiver(1700) has a sample and hold bank(1720) which holds culled voltages acquired at the burst rate and then forwards them to the analog smoothing filter(1720) at the sample rate.

The following elements perform substancially the same functions for both the CODEC and analog embodiments: the timing, framing and control circuit(1800); the video bandwidth low pass filter(1260,1560), the video/analog input sample burst combiner(1270,1570), and the transmission line driver(1280,1580) in the transmitter(1200,1500); the video horizontal sync tip DC restorer(1460,1760), the video horizontal sync tip regenerator(1470,1770), and the transmission equalizer(1480,1780) in the receiver(1400,1700); and the bidirectional transmission line driver/receiver (1900).

The transmitter sample and hold elastic buffer(1540) consists of the sample switch bank(1542) which connects the input signal to each sample and hold element in turn, the sample and hold bank(1544) of elements which hold the individual samples, and the output burst switch bank(1546) which connects the sample and hold elements to the video/ analog input sample burst combiner(1570).

The receiver sample and hold elastic buffer(1740) consists of the input burst switch bank(1746) which applies the input burst samples available at the video horizontal sync tip voltage level restorer(1760) to each sample and hold element in the proper sequence, the sample and hold bank (1744) of elements which hold the individual samples, and the reconstruction switch bank(1746) which connects each sample and hold element in turn to the analog smoothing filter(1720).

OPERATION-FIGS. 1, 3, 4, 5A, 5B, 6,
8A, 8B, 10, 11

The audio signals are sampled, and subsequently reconstructed, at a constant rate. The audio samples and digital signals are multiplexed together, and then fed to a multirate elastic buffer(1240,1540). The multiplexed signals are extracted from the elastic buffer as high frequency bursts in synchronism with the video signal horizontal synchronization pulses. During extraction, these bursts are applied to the video signal horizontal synchronization pulses. The resultant signal is then applied to a transmissiom line which has a similar transceiver at the other end.

The BASEBAND VIDEO/AUDIO/DATA TRANSCEIVER invention separates the received signals from a single transmission line by cancelling out its own transmitted signal. It also has separate connections for the transmitted and received signals for those applications which require them.

The received audio and digital data bursts are culled from the received video signal horizontal synchronization pulses, and then reshaped. The video signal horizontal synchronization pulses are simutaneously restored to the received baseband video signal. The culled bursts are fed to a second multirate elastic buffer(1440,1740) in synchronism with the received video signal horizontal synchronization pulses. The culled multiplexed signals are extracted from the second elastic buffer at a constant reconstruction rate, demultiplexed, and then reconstructed.

The transceiver synchronization is controlled by two phase locked loops(1842,1862), one for transmitter timing and one for receiver timing, each with its own clock counting chain(1843,1863). The transmitter loop is locked to the transmitted video signal horizontal synchronization pulses, while the receiver loop is locked to the received video signal horizontal synchronization pulses.

The default count values of the divider chains(1843,1845, 1847,1863,1865, 1867) and the the programmable control registers of the sequence controller(1820) present in the timing, framing and control circuit(1800) are preset to work with the NTSC television standards. The count values may be modified via the microprocessor bus interface to work with another standard. The presence of audio samples in the transmitter elastic buffer(1240,1540) mutes the received audio data to prevent feedback oscillations; alternatively, an appropriate microprocessor command from the bus causes the received audio data to be muted or unmuted.

The basic timing rates of the baseband video/audio transceiver(1000) are synchronized to the video horizontal synchronization pulses. The sampling clock, shift in clock and burst out clock are synchronized to the horizontal synchronization pulses of the output video signal at the transmitter clock generator(1840), while the reconstruction clock, shift out clock and burst in clock are synchronized to the horizontal synchronization pulses of the input video signal at the receiver clock generator(1860). The synchronization process is the same for both the transmitter clock generator(1840) and the receiver clock generator(1860), but the output video signal is independent of the input video signal, so that both circuits are needed. In the following discusion, the sampling, shift in, and burst out processes are respectively the same as the reconstruction, shift out, and burst in processes.

A timing example based on standard NTSC television is given as follows: A sample clock of 31500 Hertz (for sampling audio signals)is conveniently derived from the horizontal synchronization pulses. If the samples are quantized to 16 bits and then serialized, the result is a bit stream rate of 504,000 bits per second, which is the shift rate, and then fed to a FIFO(1240). Since there are two samples, 32 bits must be applied to the horizontal synchronization pulse at a high frequency burst rate, which is the ratio of the horizontal line interval to the horizontal synchronization pulse times the shift rate. Therefore, the samples extracted from the FIFO at 6,815,366.81 bits per second. This is a suitable sample rate in that after edge transition smoothing (1260) the bandwidth is approximatley 3.5 megahertz, which is below the 3.58 megahertz chroma subcarrier.

In a practical sense, the horizontal synchronization pulses are not available for 9 horizontal line intervals in the region of a vertical synchronization pulse. This means that the FIFO must be long enough to span the 9 horizontal line intervals in the region of a vertical synchronization pulse. The FIFO also must span at least 1 horizontal line interval while bits for a horizontal synchronization pulse burst are being queued. This results in a FIFO of at least 320 bits. A practical FIFO for NTSC television might be 330 bits to provide further elasticity for normal signal timing tolerances, such as those experienced with video cassette recorders.

Another manifestation due to the serration region about a vertical synchronization pulse is that there are too many bits, since no horizontal synchronization pulses exist in this region to accept FIFO bits. This is conveniently addressed by dropping the low order bit of each audio sample, which frees up 525 bits per vertical synchronization pulse. Moreover, 205 bits are then avaible for digital data and command bits.

FIGS. 5A and 5B show detailed waveforms of the baseband video/audio transceiver module(1000).

The sample and hold banks(1540,1740) of the analog embodiment analog embodiment of the baseband video/audio transceiver module(1000) invention must also be large enough to span the serration region, which means that 20 sample and hold elements per bank(1540,1740) are needed at 2 samples per horizontal synchronization pulse. The manifestation due to the serration region is handled differently in this case. The horizontal synchronization pulses are structured to hold four samples, three of which are analog and one of which is digital. Two positions in this structure are always used, while the third analog and the digital positions are used as required.

FIGS. 8A and 8B show detailed waveforms of the analog embodiment(1500,1700).

FIG. 10 is an illustration of how the baseband video/audio transceiver module(1000) invention may be used in an application. In this example, a suite of hypothetical generic video conference workstations(3000) are interconnected via a hypothetical generic video network switch(2000) to form a video conference workgroup. FIG. 11 shows a simplified rendition of a generic video network switch, which comprises a video crosspoint matrix switch(2200), a switching command stream interpreter circuit(2400), and a crosspoint matrix on/off selector(2600).

SUMMARY, RAMIFICATIONS, AND SCOPE

The major targets of opportunity are

LAN video conference systems.

Closed circuit television.

Low cost, general application ASIC.

Security systems.

Industrial video monitoring.

Distribution of information; education and training.

Mobile television equipment, such as tethered cameras.

The ASIC concept represents a good opportunity/risk ratio; it can be easily private labled and has the potential for both a good markup and an attractive purchase price.

Given the millions of networked personal computers in existance and expected in the future, the LAN video conference concept represents a tremendous opportunity; one where the BASEBAND VIDEO/AUDIO/DATA TRANSCEIVER invention can be a key component. Video conferencing at a premium of only a few hundred dollars per desktop can be a practical reality.

Another (incidental) target of opportunity is video telecommuting. This may become possible because the video cable companies are beginning to provide two way services, so that video may be sent out from a private home.

We claim:

1. A transceiver circuit module comprising a transmitter, a receiver, a data conversion means, an embedment means, a culling means, a reconstruction means, a control means and an interfacing means which provides for the transmission and reception of television or video signals with information signals embedded in opportune regions of said television or video signals which are any regions where video signals do not exist, in a manner which results in a single composite signal such that the greatest spectral component of said composite signal does not exceed 4.5 megahertz, said information signals being selected from a group consisting of analog audio signals which are locally acquired and held as analog samples, and analog audio signal samples converted to modulated pulse positions, and analog audio signal samples converted to modulated pulse widths, and analog audio signals which have been previously converted to serialized digital samples, and digital serial data streams, and digital serial command streams, said opportune regions being selected from a group consisting of synchronization pulses, front porch regions, back porch regions, blanking regions, and discarded video line regions, said transceiver circuit module providing inherent synchronization of said audio signal with said video signal when deployed either as a pair of said transceiver circuit modules across a single transmission line or when deployed as a multiplicity of said transceiver circuit modules across any number of switched analog video transmission lines.

2. The circuit module of claim 1 further including a multirate timing means which converts constant sample rate signals at the input into concentrated bursts of signals for alignment and embedment into said opportune regions at said transmitter, and which controls the timing and synchronization of the culling of said concentrated bursts of signals embedded in said opportune regions back to constant sample rate signals at said receiver, where the timing relationship of the transmitted signals and of the received signals may be completely independent of each other.

3. The circuit module of claim 2 further including an elastic buffer means at the transmitter and a similar elastic buffer means at the receiver, wherein said elastic buffer means provides storage for a sufficient number of samples of said embedded information signals such that no samples are lost as a consequence of said multirate timing means and notwithstanding that no signal bursts are embedded in the serrated region about a vertical synchronization pulse, and wherein the elements of said elastic buffer means are selected from the group consisting of first in first out buffers, charge transfer analog delay lines, banks of sample and hold circuits, shift registers and dual port random access memories.

4. The circuit module of claim 1 further including a reshaping means to separate and regenerate said original opportune regions, wherein said original opportune regions had been previously altered to embed said information signals being selected from said group consisting of analog audio signals which are locally acquired and held as analog samples, and analog audio signal samples converted to modulated pulse positions, and analog audio signal samples converted to modulated pulse widths, and analog audio signals which have been previously converted to serialized digital samples, and digital serial data streams.

5. The circuit module of claim 1 further comprising acquisition circuits to generate said analog samples; signal conditioning circuits for application of anti-alias filtering to said data conversion means; signal processing circuits to control the execution and sequencing of said signal embedment, said signal culling and said signal reconstruction; signal storage circuits for providing said elastic buffering; signal routing circuits to specify signal paths among said interface circuits; all of which function in a cooperative manner to transmit and receive a super composite signal consisting of a standard television baseband composite signal having said audio signals embedded into the regions of the horizontal synchronization pulses.

6. The circuit module of claim 5 wherein an analog embedment means is used to insert said audio signals into said horizontal synchronization pulses, and an analog culling means is used to recover the audio from said horizontal synchronization pulses.

7. The circuit module of claim 6 wherein said analog embedment means consists of an ordered bank of sample and hold circuits such that each of said sample and hold circuits accepts and holds an analog sample in sequential synchronization with the input sample rate, and thereafter embeds the held samples into said horizontal synchronization pulses by a summation means at a burst rate which is sufficiently high to fit said analog samples into said horizontal synchronization pulses.

8. The circuit module of claim 6 wherein said analog culling means consists of an ordered bank of sample and hold circuits such that each of said sample and hold circuits accepts and holds an analog sample in sequential synchronization with the culling burst rate, and thereafter reconstructs the original signal by sequentially scanning the held samples at the original sampling rate and applying them to a smoothing filter.

9. The circuit module of claim 5 wherein a digital embedment means is used to embed said audio, which has been previously converted to serialized digital samples, into said horizontal synchronization pulses, and a digital culling means is used to recover said serialized digital samples from said horizontal synchronization pulses.

10. The circuit module of claim 9 wherein said digital embedment means consists of an elastic buffer which accepts and stores said serialized digital samples in sequential synchronization with the input sample rate, and thereafter unloads said serialized samples from said elastic buffer, then filters said serialized samples and embeds said filtered serialized samples into said horizontal synchronization pulses by a summation means at a burst rate which is sufficiently high to fit said digital serialized samples into said horizontal synchronization pulses.

11. The circuit module of claim 9 wherein said digital culling means consists of an elastic buffer which accepts and stores said serialized digital samples in synchronization with the culling burst rate, and thereafter delivers the original serialized digital samples at the original sample rate for subsequent reconstruction.

12. The circuit module of claim 5 further including a retiming means to align the sampling boundaries of the input samples' precession with the embedment bursts' precession for transmitted signals, and retiming means to align the resampling boundaries of the output samples' precession with the culling bursts' precession for received signals.

13. The circuit module of claim 5 further including a reshaping means to separate said standard television baseband composit signal and regenerate the regions of said standard television baseband composit signal horizontal synchronization pulses.

* * * * *